United States Patent
Kim et al.

(10) Patent No.: US 9,645,407 B2
(45) Date of Patent: May 9, 2017

(54) POLARIZATION-DEPENDENT LENS STRUCTURE AND METHOD OF MANUFACTURING THE SAME

(71) Applicant: KYUNGPOOK NATIONAL UNIVERSITY INDUSTRY-ACADEMIC COOPERATION FOUNDATION, Daegu (KR)

(72) Inventors: Hak-Rin Kim, Daegu (KR); Kyung-Il Joo, Daegu (KR)

(73) Assignee: KYUNGPOOK NATIONAL UNIVERSITY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 14/893,686

(22) PCT Filed: Oct. 18, 2013

(86) PCT No.: PCT/KR2013/009350
§ 371 (c)(1),
(2) Date: Nov. 24, 2015

(87) PCT Pub. No.: WO2014/193047
PCT Pub. Date: Dec. 4, 2014

(65) Prior Publication Data
US 2016/0124239 A1 May 5, 2016

(30) Foreign Application Priority Data
May 29, 2013 (KR) .......................... 10-2013-0060734

(51) Int. Cl.
*G02F 1/13* (2006.01)
*G02B 27/28* (2006.01)
(Continued)

(52) U.S. Cl.
CPC .............. *G02B 27/285* (2013.01); *B05D 3/12* (2013.01); *B05D 5/06* (2013.01); *G02B 3/005* (2013.01);
(Continued)

(58) Field of Classification Search
CPC .... G02B 27/285; G02B 27/286; G02B 3/005; G02B 3/0087; G02B 3/08; G02B 5/3083; B05D 3/12; B05D 5/06
See application file for complete search history.

(56) References Cited

U.S. PATENT DOCUMENTS

| 8,587,734 B2 * | 11/2013 | Li | G02C 7/08 349/13 |
| 2012/0099034 A1 | 4/2012 | Pijlman et al. | |
| 2012/0260986 A1 * | 10/2012 | Chen | G02F 1/29 136/259 |

FOREIGN PATENT DOCUMENTS

| JP | 2009151877 | 7/2009 |
| JP | 2013015754 | 1/2013 |

(Continued)

OTHER PUBLICATIONS

International Search Report—PCT/KR2013/009350 dated Feb. 27, 2014.

*Primary Examiner* — James Dudek
(74) *Attorney, Agent, or Firm* — Cantor Colburn LLP (57) ABSTRACT

Provided is a polarization-dependent lens structure. The lens structure includes an optically-isotropic polymer layer having a reverse lens shape on a first surface and a lens portion where the surface of the optically-isotropic polymer layer is filled with liquid crystalline polymers, nano-scale 1D lattice structures (nano-scale grooves) are formed on an upper surface thereof, and the liquid crystalline polymers are aligned by the nano-scale 1D lattice structures along a direction of long axes of the 1D lattice structures, wherein
(Continued)

it is determined according to a polarization direction of incident light whether or not the polarization-dependent lens structure operates as a lens.

15 Claims, 7 Drawing Sheets

(51) Int. Cl.
*G02B 3/00* (2006.01)
*B05D 3/12* (2006.01)
*B05D 5/06* (2006.01)
*G02B 3/08* (2006.01)
*G02B 5/30* (2006.01)
*G02B 1/14* (2015.01)
*G02B 27/22* (2006.01)

(52) U.S. Cl.
CPC ............ *G02B 3/0087* (2013.01); *G02B 3/08* (2013.01); *G02B 5/3083* (2013.01); *G02B 27/286* (2013.01); *G02B 1/14* (2015.01); *G02B 27/2214* (2013.01)

(56) References Cited

FOREIGN PATENT DOCUMENTS

| KR | 1020080001172 | 1/2008 |
| KR | 1020090047933 | 5/2009 |
| KR | 20120091646 | 8/2012 |
| KR | 101241770 | 3/2013 |

* cited by examiner

POLARIZATION-DEPENDENT LENS STRUCTURE AND METHOD OF MANUFACTURING THE SAME

TECHNICAL FIELD

The present invention relates to a polarization-dependent lens structure and a method of manufacturing the same, and more particularly, a polarization-dependent lens structure and a method of manufacturing the same where a lens portion is configured to be formed on an isotropic polymer layer having a concave lens shape so that liquid crystalline polymers induced from a surface of a mold by using the mold where nano-scale 1D lattice structures are formed on a surface thereof are aligned to have a convex lens shape, and thus, it is determined according to polarization direction of incident light whether or not the polarization-dependent lens structure operates as a lens.

BACKGROUND ART

Recently, much attention has been paid to 3D display devices. According to implementation methods, the 3D display devices are classified into a stereoscopic type using parallax between two eyes, an integral imaging type, a holographic type, a volumetric 3D display type, and the like. Among these types of displays, the stereoscopic display devices are classified into a glasses type 3D display devices using glasses and a non-glasses type 3D display devices using no glasses. In general, 3D display using no glasses is called auto-stereoscopic 3D display.

The non-glasses 3D display needs to be implemented to be capable of selecting 2D or 3D mode in order to support both of 2D images and 3D images. Various techniques for the implementation have been developed.

In one of these techniques, a lens array structure which actively operates as a lens only when a viewer observes 3D images is formed on a 2D display. As a representative technique for implementing the active lens, there are a method using an electro-wetting effect and a method using an electro-optical effect.

As a technique for an active liquid crystal lens which can be used for a 2D/3D switchable display device capable of selecting one of 2D and 3D images, there is a technique for a polarization-dependent liquid crystal lens of which focusing characteristics are varied according to an alignment direction of a liquid crystal layer constituting the lens and polarization of incident light. By using this technique, 2D or 3D images can be selectively displayed by changing polarization conditions of light which is emitted from a 2D image display panel and is incident on a polarization-dependent liquid crystal lens layer.

Figure 1:
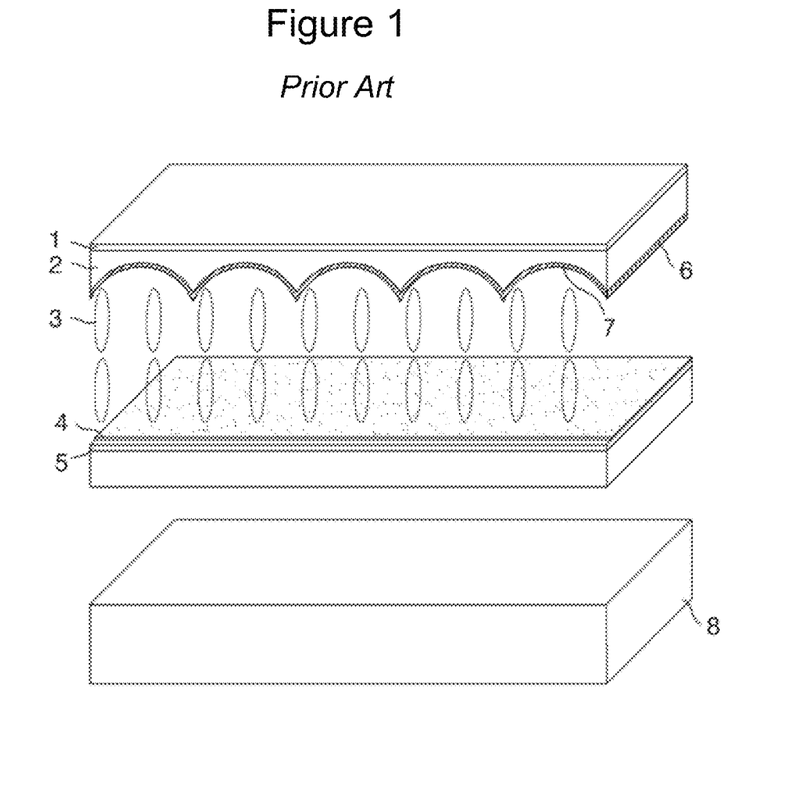
FIG. 1 is a cross-sectional diagram illustrating alignment of liquid crystals in a liquid crystal layer constituting a liquid crystal lens by using an alignment layer in the related art.

FIG. 1 is a cross-sectional diagram illustrating alignment of liquid crystals of a liquid crystal layer by using an alignment layer in the related art. FIG. 1 is a diagram disclosed in Korean Patent Publication No. 10-2008-0001172 (Title: Lenticular Lens and Liquid Crystal Alignment Method). Referring to FIG. 1, in order to align liquid crystals or liquid crystalline polymers, in the lens structure in the related, alignment layers 4 and 6 are formed on surfaces of two substrates adjacent to the liquid crystal layer, and a liquid crystal layer 3 or a liquid crystalline polymer layer is formed thereon. In this case, in order to form the alignment layer, an alignment layer material such as polyimide (PI) is printed on the surface of the substrate, and curing is performed by applying heat or light. Next, by rubbing in a specific direction, the alignment layer material is aligned, so that the alignment layer is obtained.

In this case, the lower substrate where the alignment layer is formed needs to be made of a material having a characteristic that the material is invulnerable to heat or light illumination for curing the alignment layer.

In addition, the lower substrate where the alignment layer is formed needs to be made of a material which is not dissolved by an organic solvent contained in the alignment layer during the coating of the alignment layer. Therefore, there is a problem in that the material which can be used for the substrate is limited to a material resistant to an alignment layer forming process.

In addition, since the liquid crystalline polymer layer is aligned by the alignment layer formed on the surface of the substrate, in the case where a thickness of the liquid crystalline polymer layer is large, a region adjacent to the the alignment layer is well aligned, but a region far from the alignment layer is not well aligned. Therefore, there is a problem in that the liquid crystalline polymer layer is not uniformly aligned over the entire region by the underlying alignment layer. In particular, because of these problems, in the case of implementing a single-vision lens having a short focal length of several millimeters or less as a graded refractive index (GRIN) lens by using the liquid crystalline polymer, as a curvature of an isotropic polymer layer is increased, the thickness of the formed liquid crystalline polymer layer becomes large, so that serious problem occurs in alignment of the liquid crystalline polymer layer.

DISCLOSURE

Technical Problem

In order to solve the above-described problems, the present invention is to provide a polarization-dependent lens structure where a lens portion configured with liquid crystalline polymers which are induced from an upper portion of a mold surface by using a mold where nano-scale 1D lattice structures are formed on a surface thereof to be aligned without a separate alignment layer in an isotropic polymer layer having a reverse lens shape is formed on the isotropic polymer layer having a reverse lens shape, so that it is determined according to polarization of incident light whether or not the polarization-dependent lens structure operates as a lens.

The present invention is also to provide a polarization-dependent lens structure capable of aligning without influence on a substrate.

The present invention is also to provide a method of manufacturing a polarization-dependent lens structure using a method of forming nano-scale 1D lattice structures on a surface thereof in order to align a liquid crystalline polymers of a lens portion without an alignment layer forming process, so that the liquid crystalline polymer can be more stably aligned without influence on a substrate.

The present invention is also to provide a structure and a method of manufacturing the structure where a reverse lens shape of an isotropic polymer layer for forming a lens portion configured with liquid crystalline polymers is a shape reverse to a shape of a Fresnel lens, so that the lens portion formed thereon has a small thickness and a single-vision lens having a short focal length of several millimeters or less can be implemented. In addition, the present invention is to provide a structure and a method of manufacturing the same capable of improving a degree of alignment of a liquid crystalline polymer layer of a polarization-dependent lens where it is determined according to polarization of incident light whether or not the structure operates as a lens.

Technical Solution

According to a first aspect of the present invention, there is provided a polarization-dependent lens structure including an optically-isotropic polymer layer having a reverse lens shape on a first surface, and a lens portion where the surface of the optically-isotropic polymer layer is filled with liquid crystalline polymers, nano-scale 1D lattice structures (nano-scale grooves) are formed on an upper surface thereof, and the liquid crystalline polymers are aligned by the nano-scale 1D lattice structures along a direction of long axes of the 1D lattice structures, wherein it is determined according to a polarization direction of incident light whether or not the polarization-dependent lens structure operates as a lens.

In the polarization-dependent lens structure according to the first aspect, preferably, the lens portion is formed as a Fresnel lens or a GRIN lens.

In the polarization-dependent lens structure according to the first aspect, preferably, the lens portion further includes a substrate made of a transparent material on a second surface facing the first surface of the optically-isotropic polymer layer.

In the polarization-dependent lens structure according to the first aspect, preferably, the lens portion further includes a protection layer for preventing alignment of the liquid crystalline polymers on the surface from being destructed.

In the polarization-dependent lens structure according to the first aspect, preferably, the long axes of the 1D lattice structures of the lens portion are aligned in a direction horizontal or vertical to an axis of the lens.

In the polarization-dependent lens structure according to the first aspect, preferably, the optically-isotropic polymer layer is formed in a reverse lens shape on the first surface by performing nano-imprinting by using a lens-shaped mold.

In the polarization-dependent lens structure according to the first aspect, preferably, the nano-scale 1D lattice structure is configured with lattices having such a period that optical diffraction of light incident on the lens portion does not occur.

According to a first aspect of the present invention, there is provided a method of manufacturing a polarization-dependent lens structure, including steps of (a) preparing a substrate, (b) applying an optically-isotropic polymer material on the substrate and, after that, forming a optically-isotropic polymer layer having a reverse lens shape on an upper surface thereof, (c) coating an upper surface of the optically-isotropic polymer layer with liquid crystalline monomers, (d) arranging the liquid crystalline monomers by allowing a mold having nano-scale 1D lattice structures to be in contact with a surface of the coated liquid crystalline monomers, (e) forming a liquid crystalline polymer layer by photo-curing the liquid crystalline monomers, and (f) forming a lens portion on which a surface the nano-scale 1D lattice structures are formed by separating the mold.

In the polarization-dependent lens structure according to the second aspect, preferably, the step (b) includes steps of applying the optically-isotropic polymer material on the substrate, and forming a reverse lens shape on an upper surface of the applied optically-isotropic polymer material by performing nano-imprinting by using a nano-scale lens-shaped mold.

In the polarization-dependent lens structure according to the second aspect, preferably, in the step (d), the mold having the nano-scale 1D lattice structures is in contacted with the surface of the liquid crystalline monomers so that long axes of the 1D lattice structures are aligned in a direction horizontal or vertical to an axis of a lens.

In the polarization-dependent lens structure according to the second aspect, preferably, the method further includes a step of removing the substrate as a final step.

Advantageous Effects

In a polarization-dependent lens structure according to the present invention, a lens portion is formed by aligning a liquid crystalline polymer layer having optical anisotropy on an isotropic polymer layer having a reverse lens shape, so that characteristics of operation as a lens is switched according to polarization of incident light.

The isotropic polymer layer having a reverse lens shape is formed in a shape reverse to that of a Fresnel lens, so that a single-vision lens having ideal focusing characteristics can be implemented by using a polarization-dependent lens structure having a liquid crystalline polymer layer having a small thickness.

With respect to alignment of a liquid crystalline polymer layer formed on an isotropic polymer layer having a shape reverse to that of a Fresnel lens, a mold where nano-scale 1D lattice structures are formed on a surface thereof is in contact with an upper portion, and by using the liquid crystalline polymers which are induced from an upper portion of a mold surface to be arranged without a separate alignment layer process, the nano-scale 1D lattice structures are formed on the upper surface of the lens portion, so that a degree of alignment of the liquid crystalline polymers constituting the lens portion can be improved without a separate alignment layer process.

In a polarization-dependent lens structure according to the present invention, an isotropic polymer layer underlying a lens portion configured with liquid crystalline polymers is configured in a shape reverse to that of a Fresnel lens, so that a focus characteristic can be obtained by the lens portion having a small thickness, and the liquid crystalline polymers of the lens portion can be aligned by using a mold where nano-scale 1D lattice structures are formed on a surface thereof, so that an alignment characteristic can be improved.

In addition, in a polarization-dependent lens structure according to the present invention, a separate alignment layer process is not performed, so that there is no problem of destruction of an underlying isotropic polymer layer having a reverse lens shape caused by a heat curing process of an alignment layer or an organic solvent contained in the alignment layer. Therefore, in the polarization-dependent lens structure according to the present invention, since there is no need for the alignment layer process, a material for the isotropic polymer layer having a reverse lens shape formed under the liquid crystalline polymer lens layer can be freely selected without occurrence of thermal decomposition caused by heat or dissolution problem caused by an organic solvent.

BEST MODE

In a polarization-dependent lens structure according to the present invention, a lens portion is formed by forming a liquid crystalline polymers having birefringence in a lens shape, aligning the liquid crystalline polymers in a certain direction, performing photo-curing, so that the polarization-dependent lens structure operates as a lens or an optically transparent layer having no focusing function according to polarization direction of incident light.

Hereinafter, a configuration, a manufacturing method, and operations of a polarization-dependent lens structure according to an exemplary embodiment of the present invention will be described in detail.

Configuration of Polarization-Dependent Lens Structure

Figure 2:
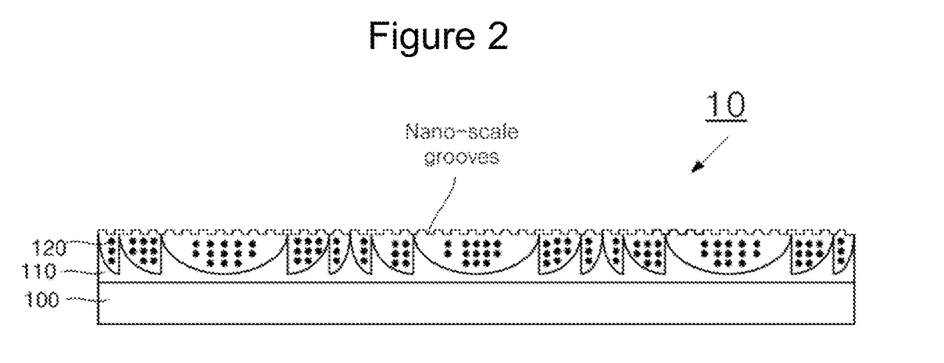
FIG. 2 is across-sectional diagram illustrating an example of a polarization-dependent lens structure configured with a Fresnel lens in a polarization-dependent lens structure according to an exemplary embodiment of the present invention.

FIG. 2 is a cross-sectional diagram illustrating the polarization-dependent lens structure according to an exemplary embodiment of the present invention.

Referring to FIG. 2, the polarization-dependent lens structure 10 according to the embodiment is configured with a lens portion 120 including a substrate 100, an optically-isotropic polymer layer 110 having a reverse lens shape on a first surface, and liquid crystalline polymers formed to be aligned in the lens shape on a surface of the polymer layer.

As the substrate 100, a glass made of a transparent material or a polymer film such as PET made of a flexible transparent optically-isotropic material. The substrate 100 is disposed on the lower surface of the isotropic polymer layer having a reverse lens shape to function as a substrate of the lens structure 10. After the polarization-dependent lens structure is completely formed, the substrate may be peeled off.

The optically-isotropic polymer layer 110 is formed with a transparent material on the upper surface of the substrate. The optically-isotropic polymer layer is formed on the first surface to have a reverse lens shape. The optically-isotropic polymer layer may be formed in s shape reverse to that of the Fresnel lens on the surface by performing nano-imprinting by using a mold having a pattern having a lens shape of a Fresnel lens or may be formed in a shape reverse to that of the Fresnel lens on the surface by performing nano-imprinting by using a mold having a pattern having a lens shape of a GRIN lens.

The lens portion 120 is formed with photo-curable liquid crystalline polymers on the first surface of the optically-isotropic polymer layer. After coating of the photo-curable liquid crystalline polymers, in the photo-curing by using UV, a mold where nano-scale 1D lattices are formed is formed to be in contact with the upper portion thereof, so that the liquid crystalline polymers are aligned in a lattice direction. Therefore, finally, the nano-scale 1D lattice structures (nano-scale grooves) are formed on the upper surface of the lens portion.

The 1D lattice structures formed on the upper surface of the lens portion are preferably are formed to have such a period that optical diffraction of the incident light does not occur. Therefore, the 1D lattice structures may be formed to have a period of tens of nanometers or less.

The lens portion 120 is made of photo-curable liquid crystalline polymers having birefringence. Therefore, due to optical anisotropy of the liquid crystalline polymers, the lens portion has an extraordinary refractive index $n_e$ in the alignment direction and an ordinary refractive index $n_o$ in the direction perpendicular to the alignment direction. In this case, the polymer layer having a shape reverse to that of the Fresnel lens formed in the lower portion is made of an optically-isotropic material, and the refractive index $n_p$ thereof has a relationship $n_p = n_o$ of optical matching (refractive index matching) with respect to the ordinary refractive index $n_o$ of the liquid crystalline polymer layer. In addition, the refractive index of the polymer layer having a reverse lens shape has a relationship $n_e > n_p$ with respect to extraordinary refractive index $n_e$ of the liquid crystalline polymer layer having a lens shape, and it is determined according to the polarization condition of the incident light whether or not the lens portion operates as a lens.

Figure 3:
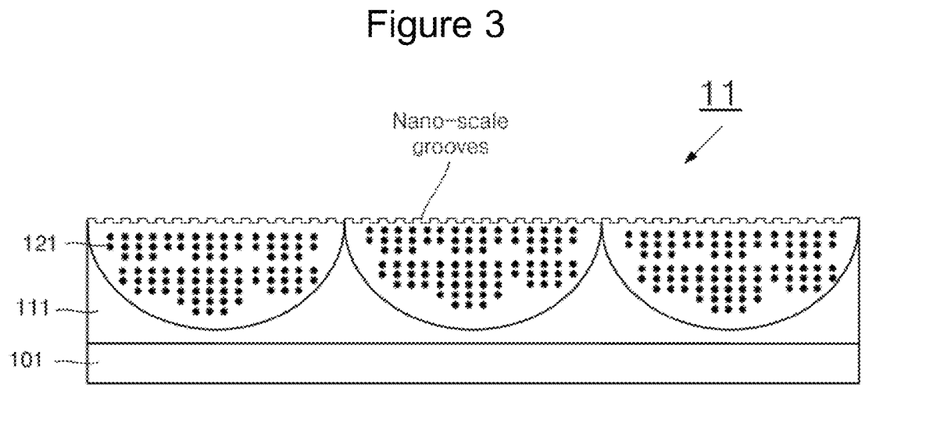
FIG. 3 is across-sectional diagram illustrating an example of a polarization-dependent lens structure configured as a GRIN lens in a polarization-dependent lens structure according to an exemplary embodiment of the present invention.

FIG. 2 is across-sectional diagram illustrating an example of a polarization-dependent lens structure configured as a Fresnel lens according to the present invention. FIG. 3 is a cross-sectional diagram illustrating an example of a polarization-dependent lens structure configured with a GRIN lens according to the present invention.

In particular, as illustrated in FIG. 2, the lens portion is configured in a shape of the Fresnel lens, so that the total thickness of the lens can be further reduced in comparison with the case where the lens portion is configured in a shape of the GRIN lens. In this manner, due to reduction in thickness of the lens, a degree of alignment of the lens portion can be improved. Therefore, control of the liquid crystalline polymer layer according to design of lens parameters can be more accurately performed, and a degree of aberration of the lens according to an incident angle of the light can be reduced.

Figure 4:
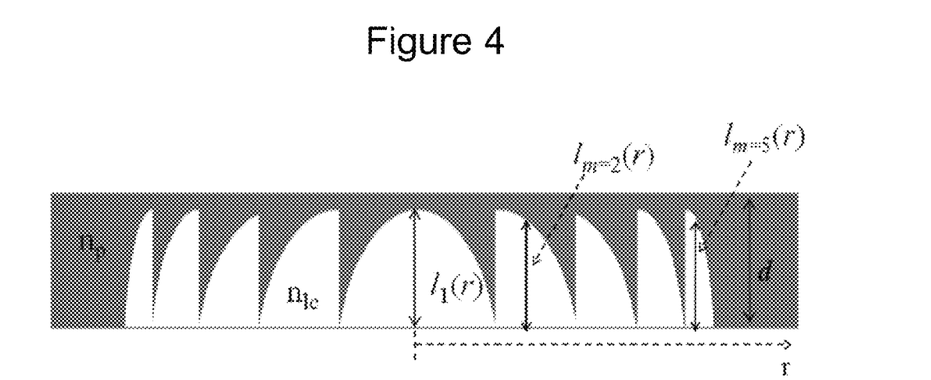
FIG. 4 is a conceptual diagram illustrating a configuration and an optical design of a polarization-dependent liquid crystalline polymer Fresnel lens including an isotropic polymer layer having a shape reverse to a shape of the Fresnel lens and liquid crystalline polymers aligned on the polymer layer to fill in the polarization-dependent lens structure according to the exemplary embodiment.

FIG. 4 is conceptual diagram illustrating a Fresnel lens. Referring to FIG. 4, for implementation of the Fresnel lens having a focal length f, the condition of the polymer layer having a reverse lens shape and the condition of the liquid crystalline polymer layer having a lens shape are expressed by the following Mathematical Formula 1.

$$l_m(r) = \frac{\lambda(m+1)}{n_{lc} - n_p} - \frac{\sqrt{f^2 + r^2} - f}{n_{lc} - n_p}$$ [Mathematical Formula 1]

Herein, $l_m(r)$ denotes a thickness of the liquid crystalline polymer layer at a position r of the Fresnel lens; m denotes a Fresnel zone plate number of a Fresnel Zone plate in the Fresnel lens; l denotes a wavelength of the incident light; and $n_{lc}$ and $n_p$ denote a refractive index of the liquid crystalline polymer layer and a refractive index of the isotropic polymer layer having a reverse lens shape, respectively. In this case, the refractive index $n_{lc}$ becomes an extraordinary refractive index or an ordinary refractive index according to the alignment direction of the liquid crystalline polymer layer or according to the polarization of the incident light, and the refractive index $n_p$ is independent of the polarization of the incident light.

On the other hand, the polarization-dependent lens structure according to the exemplary embodiment of the present invention may further include a protection layer (not shown) on the above-described lens portion 120. The protection layer is provided in order to prevent the alignment of the liquid crystalline polymers of the lens portion from being destructed because of external influence such as moisture, UV, or surface scratch according to mechanical contact. After the lens is manufactured, the protection layer may be formed.

As the protection layer, an organic polymer may be used. The organic polymer needs to be a material which does not influence the alignment of the liquid crystalline polymers. As conditions that the organic polymer does not influence of the alignment of the liquid crystalline polymers, a heat curing temperature of the organic polymer is required to be a low temperature of 100 to 150° C. or less; and a solvent does not chemically react with the liquid crystalline polymer. As the organic polymer satisfying these conditions, there is a hydrophilic polymer such as PVA or PPV. Alternatively, as the protection layer, an inorganic material capable of preventing the alignment of the liquid crystalline polymer from being destructed may be used by using a vapor deposition process.

On the other hand, in the polarization-dependent lens structure according to the exemplary embodiment of the present invention, in the case where the lens portion is configured as the GRIN lens, the thickness of the lens portion is increased unlike the case where the lens portion is configured as the Fresnel lens. Therefore, in the case where the polarization-dependent lens structure is configured as the GRIN lens having a large thickness, in order to stably align the entire liquid crystalline polymers constituting the lens portion, an alignment layer may be further formed between the first surface of the optically-isotropic polymer layer 110 and the lens portion. In this manner, the alignment layer is further formed on the first surface of the optically-isotropic polymer layer, so that the entire liquid crystalline polymers of the lens portion can be stably aligned by the alignment layer disposed on the lower surface and the nano-scale 1D lattice structures disposed on the upper surface.

Method of Manufacturing Polarization-Dependent Lens Structure

Hereinafter, a method of manufacturing a polarization-dependent lens structure according to an exemplary embodiment of the present invention will be described.

Figure 5:
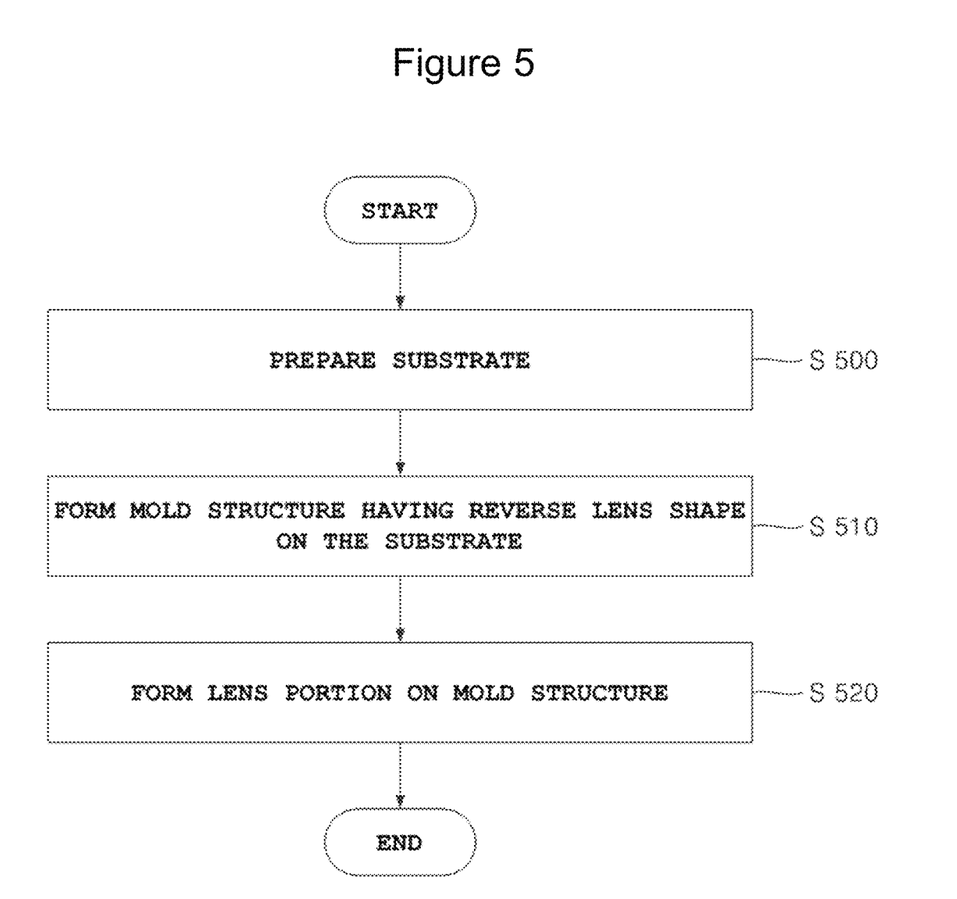
FIG. 5 is a flowchart illustrating a sequence of processes of a method of manufacturing a polarization-dependent lens structure according to an exemplary embodiment of the present invention.

FIG. 5 is a flowchart illustrating a sequence of processes of the method of manufacturing the polarization-dependent lens structure according to the exemplary embodiment of the present invention. Referring to FIG. 5, the method of manufacturing the polarization-dependent lens structure according to an exemplary embodiment of the present invention is configured to include a step 500 of preparing a substrate; a step 510 of forming an optically-isotropic polymer layer having a reverse lens shape on the substrate; and a step 520 of forming a lens portion made of liquid crystalline polymers which are aligned in a direction horizontal or vertical to an axis of the lens on the surface of the optically-isotropic polymer layer. In addition, the method may further include a step 530 of forming a protection layer for preventing the alignment of the liquid crystalline polymers on the surface of the lens portion from being destructed.

On the other hand, after the polarization-dependent lens structure is completely formed, the substrate may be peeled off from the optically-isotropic polymer layer. In the case were, after the polarization-dependent lens structure is completely formed, the substrate is peeled off, in order to facilitate peeling the substrate off, before the optically-isotropic polymer layer having a reverse lens shape is formed, a hydrophilic organic film such as PVA may be formed on the surface of the substrate by coating. Since the hydrophilic organic film such as PVA is easily dissolved in water which does not influence the polarization-dependent lens structure, the produced polarization-dependent lens structure on the substrate is immersed into water to dissolve the PVA layer, so that the substrate can be easily peeled off from the polarization-dependent lens structure.

Figure 6:
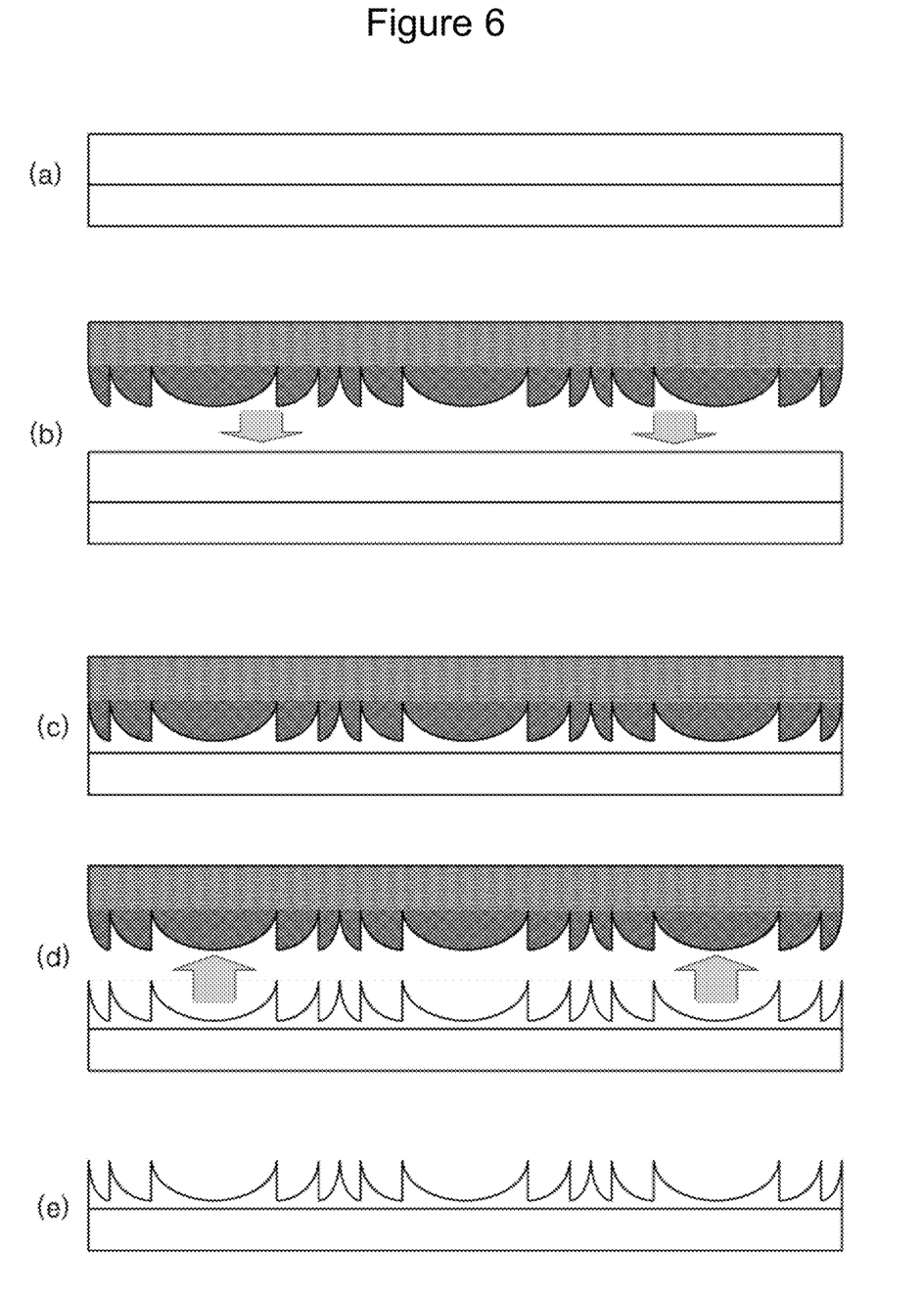
FIG. 6 is a conceptual diagram illustrating a process of forming an isotropic polymer layer having a phase opposite to that of the Fresnel lens by using a nano-imprinting process in the method of manufacturing the polarization-dependent lens structure according to the present invention.

FIG. 6 is a conceptual diagram illustrating a process of forming the optically-isotropic polymer layer having a phase opposite to that of the Fresnel lens by using a nano-imprinting process in the method of manufacturing the polarization-dependent lens structure according to the present invention. Hereinafter, the process of forming the optically-isotropic polymer layer having a reverse lens shape will be described in detail with reference to FIG. 6. Referring to FIG. 6, the process includes uniformly applying optically-isotropic polymer materials made of a transparent material on the substrate (a), performing nano-imprinting on the surface by using a lens-shaped mold, and after that, performing heat curing or photo-curing on the coated polymer materials (b and c), removing the mold which is in contact (d), and forming an optically-isotropic polymer layer having a reverse lens shape on the surface (e).

Therefore, as illustrated in (e) of FIG. 6, the surface of the optically-isotropic polymer layer has a reverse lens shape, and the lens portion 120 formed on the optically-isotropic polymer layer is configured in a lens shape.

Figure 7:
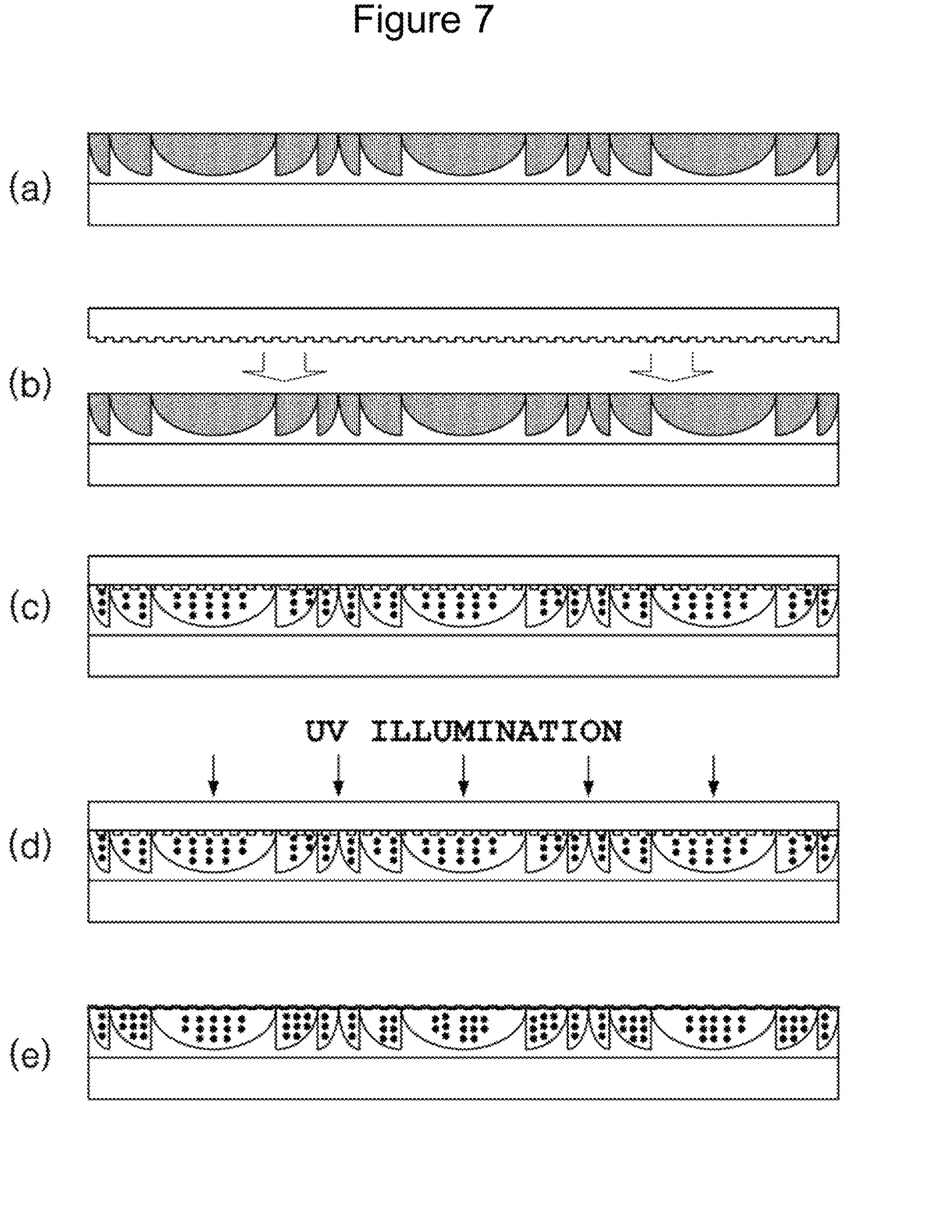
FIG. 7 is a conceptual diagram illustrating a process of forming a lens portion by inducing alignment of liquid crystalline polymers by using a mold having a nano-scale 1D lattice structure in the method of manufacturing the polarization-dependent lens structure according to the present invention.

FIG. 7 is a conceptual diagram illustrating a process of forming the lens portion by inducing alignment of liquid crystalline polymers by using a mold having a nano-scale 1D lattice structure in the method of manufacturing the polarization-dependent lens structure according to the present invention. Hereinafter, the process of forming the lens portion will be described in detail with reference to FIG. 7.

Referring to FIG. 7, the process of forming the lens portion includes allowing photo-curable liquid crystalline monomers to be coated on the surface of the optically-isotropic polymer layer (a), allowing a mold having nano-scale 1D lattice structures having a size of tens of nanometers or less to be in contact with the surface of the photo-curable liquid crystalline monomers (b), inducing alignment of the photo-curable liquid crystalline monomers along the direction of the nano-scale lattice structures (c), forming a stabilized liquid crystalline polymer layer by photo-curing the photo-curable liquid crystalline monomers with UV to allow the direction of the nano-scale lattice structures to be coincident with the alignment direction (d), and forming the lens portion where the liquid crystalline polymer layer is aligned in the direction of the lattice in the state where the nano-scale lattice structures are formed on the substrate by separating and removing the mold (2). In FIGS. 6 and 7, in order to obtain a uniform surface shape by uniform contact, the mold which is in contact to form the optically-isotropic polymer layer having a reverse lens shape or the mold which is in contact to form the aligned liquid crystalline polymer layer may be configured with an elastic polymer material such as polydimethylsiloxane (PDMS) or polyurethane acrylate (PUA) which has low surface energy at the time of removing the mold to facilitate removing the mold. In FIGS. 6 and 7, in order to obtain sharp portions at the boundaries between the lens portions of the lens array, the mold of the substrate produced as a mold may be used. In this case, in order to facilitate peeling the mold off without deformation of the isotropic polymer layer, the substrate produced as a mold may be coated with a hydrophobic material having low surface energy.

In FIG. 7, the lattice period of the mold having a nano-scale 1D lattice structure which is in contact with the coated liquid crystalline monomer layer to induce the alignment of the liquid crystalline polymer layer needs to be smaller than the wavelength of the incident light so that an optical diffraction phenomenon does not occur on the surface of the liquid crystalline polymer. Preferably, the lattice period is tens of nanometers or less.

On the other hand, in the case where the thickness of the lens portion is large, the method of manufacturing the polarization-dependent lens structure according to the present invention further includes a step of forming an alignment layer on the upper surface of the isotropic polymer layer having a reverse lens shape, so that the liquid crystalline polymers constituting the lens portion can be stably aligned by the upper alignment layer and the lower nano-scale 1D lattice structures. In particularly, in the case where the lens portion is configured as a GRIN lens and, thus, the thickness of the lens portion is large, an alignment layer is preferably formed between the optically-isotropic polymer layer and the lens portion so that the liquid crystalline polymers constituting the lens portion can be stably aligned.

As illustrated in (a) and (b) of FIG. 7, the photo-curable liquid crystalline monomers with which the isotropic polymer layer having a reverse lens shape is coated have a distribution where the directors are randomly distributed without regularity of the alignment direction. As illustrated in (c) of FIG. 7, the mold having a nano-scale 1D lattice structure is allowed to be in contact with the upper surface of the photo-curable liquid crystalline monomers, so that the alignment of the photo-curable liquid crystalline monomers can be induced along the direction of the long axes of the nano-scale 1D lattices. At this time, before the polymerization by photo-curing, since the molecular weight of the monomers is low, the alignment of the monomers can be easily formed. By photo-curing the monomers having such alignment by UV illumination in the state where the monomers are in contact with the mold, the polymerization is performed, so that the liquid crystalline polymer layer of which the alignment is thermally or optically stabilized is obtained.

Figure 8:
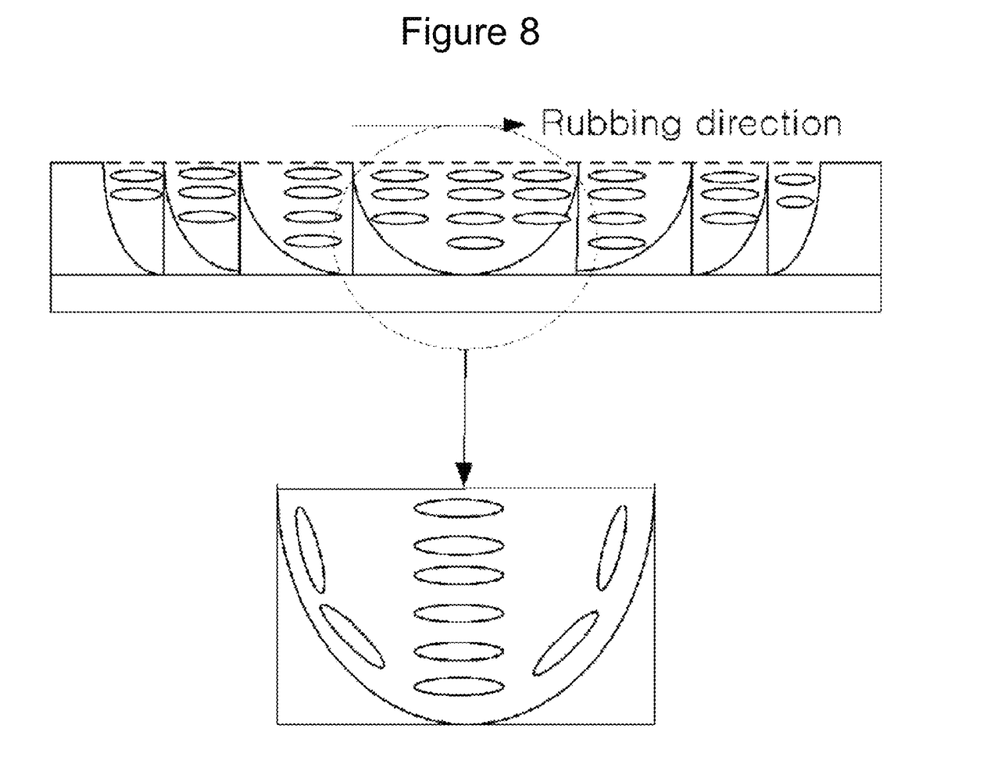
FIG. 8 is a conceptual diagram illustrating a problem according to an alignment direction of liquid crystalline polymers.

On the other hand, the alignment direction of the liquid crystalline polymers in the lens portion can be configured to be coincident with the direction horizontal or vertical to the axis of the lens. However, in the structure according to the present invention, in order to obtain more ideal lens shape and optical lens effect, the alignment of the liquid crystalline polymers is preferably induced to be coincident with the direction horizontal to the axis of the lens. FIG. 8 is a conceptual diagram illustrating a problem according to the alignment direction of liquid crystalline polymers. Referring to FIG. 8, it can be understood that, in the case where the liquid crystalline polymers are aligned in the direction vertical to the axis of the lens, the directors in the curved portion of the lens may be aligned in the undesired direction.

Like this, if the liquid crystalline polymers in a portion of the lens are aligned in the undesired direction, there is a problem in that initially-designed parameters of the lens are changed. Therefore, in the present invention, in order to obtain more ideal lens profiles, the liquid crystalline polymers are preferably aligned in the direction horizontal to the axis of the lens.

In this manner, in order to align the liquid crystalline polymers in the direction horizontal or vertical to the axis of the lens, the nano-scale 1D lattice structures are preferably formed to be horizontal or vertical to the axis of the lens. In particular, more preferably, the longitudinal direction of the nano-scale 1D lattice structures is formed to be coincident with the axis of the lens, so that the liquid crystalline polymers are aligned in the direction horizontal to the axis of the lens.

Operation of Polarization-Dependent Lens Structure

Hereinafter, operations of the polarization-dependent lens structure according to the present invention will be described in detail.

Figure 9:
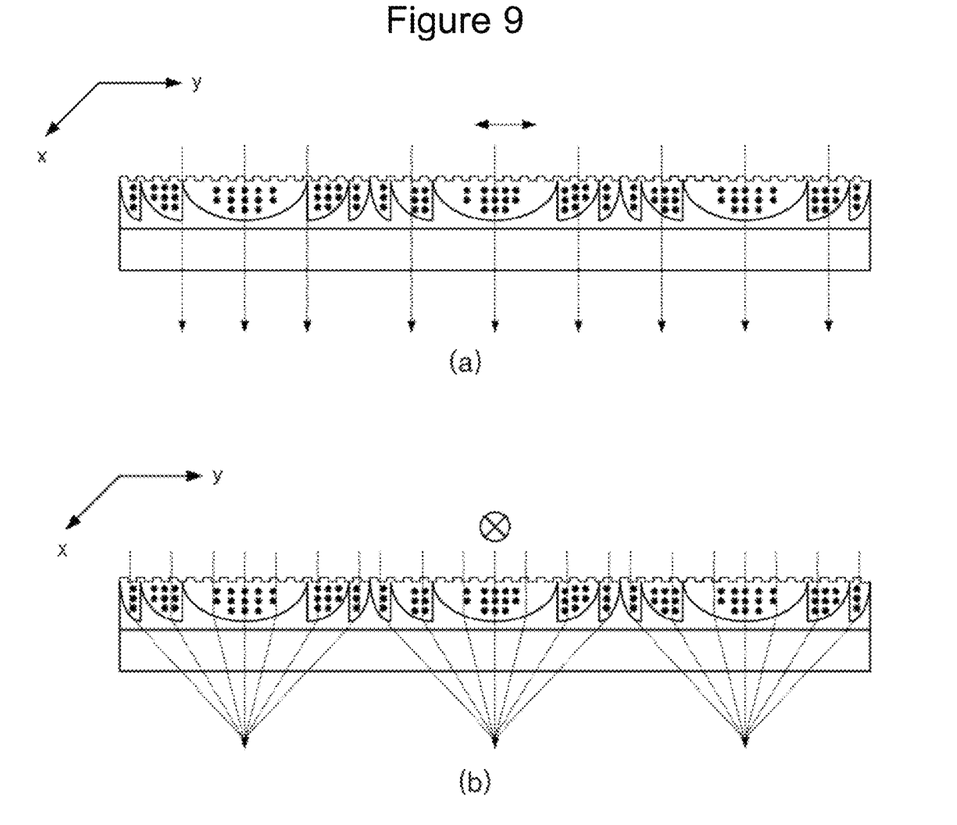
FIG. 9 is a conceptual diagram illustrating transmission characteristics of incident light according to polarization in an array of polarization-dependent lens structures according to the present invention.

FIG. 9 is a conceptual diagram illustrating transmission characteristics of incident light according to polarization in an array of polarization-dependent lens structures according to the present invention.

(a) of FIG. 9 illustrates characteristics that the lens structure does not operates as a convex lens for the polarization condition of the incident light, so that the incident light propagates straight; and (b) of FIG. 9 illustrates characteristics that the lens structure operates as a convex lens for the polarization condition of the incident light.

In FIG. 9, the directions of the x and the y axes are illustrated, and the direction of the x axis is coincident with the alignment direction of the long axes of the liquid crystalline polymers constituting the lens portion. Therefore, in the case where the polarization direction of the incident light is coincident with the x axis, the array of polarization-dependent lens structures is designed to operate as a lens; and in the case where the polarization direction of the incident light is coincident with the y axis, the array of polarization-dependent lens structures is designed to operate as a transparent layer.

Referring to (a) of FIG. 9, in the case where the incident light is a linearly-polarized light of which the polarization direction is coincident with the y axis, since the refractive index of the liquid crystalline polymer layer is equal to the refractive index of the isotropic polymer layer having a reverse lens shape, the vertically incident light propagates straightly without refraction. Referring to (b) of FIG. 9, in the case where the incident light is a linearly-polarized light of which the polarization direction is coincident with the x axis, the vertically incident light undergoes a convex lens effect by the liquid crystalline polymer layer and a concave lens effect by the isotropic polymer layer having a reverse lens shape. In the polarization-dependent lens structure according to the present invention, since the extraordinary refractive index of the liquid crystalline polymer layer is configured to larger than the refractive index of the isotropic polymer layer, the vertically incident light effectively undergoes the convex lens effect, so that the characteristic that the incident light is periodically focused can be obtained.

As illustrated in FIG. 9, when linearly-polarized light of which the polarization direction is the same as the alignment direction of the long axes of the liquid crystalline polymers is incident on the array of polarization-dependent lens structures according to the present invention, the light beams passing through the lens structures are focused in a line shape. Therefore, the present invention can be applied to a light element requiring a line-shaped beam pattern which is periodically focused. In addition, if an optical layer such as twisted nematic liquid crystal (TN LC) element capable of switching the polarization is attached on the front or rear surface of the array of polarization-dependent lens structures, the array of polarization-dependent lens structures can be used as an electrically-variable polarization-dependent lens array for a 2D/3D switchable non-glasses stereoscopic display device.

While the present invention has been particularly shown and described with reference to exemplary embodiments thereof, it will be understood by those skilled in the art that various changes and modifications in form and details may be made therein without departing from the spirit and scope of the present invention as defined by the appended claims.

INDUSTRIAL APPLICABILITY

A polarization-dependent lens structure according to the present invention of which on the front or rear surface an element capable of switching the polarization is attached can be used as a lens unit for a 2D/3D switchable non-glasses 3D display.

The invention claimed is:

1. A polarization-dependent lens structure comprising:
an optically-isotropic polymer layer having a reverse lens shape on a first surface; and
a lens portion where the surface of the optically-isotropic polymer layer is filled with liquid crystalline polymers, nano-scale 1D lattice structures (nano-scale grooves) are formed on an upper surface thereof, and the liquid crystalline polymers are aligned by the nano-scale 1D lattice structures along a direction of long axes of the 1D lattice structures,
wherein it is determined according to a polarization direction of incident light whether or not the polarization-dependent lens structure operates as a lens.

2. The polarization-dependent lens structure according to claim 1, wherein the lens portion is formed as a Fresnel lens.

3. The polarization-dependent lens structure according to claim 1, wherein the lens portion is formed as a GRIN lens.

4. The polarization-dependent lens structure according to claim 1, wherein the lens portion further includes a substrate made of a transparent material on a second surface facing the first surface of the optically-isotropic polymer layer.

5. The polarization-dependent lens structure according to claim 1, wherein nano-scale 1D lattice structures are formed on a upper surface of the lens portion by which a mold having nano-scale 1D lattice structures is in contact with the upper surface of the lens portion and then is removed from the surface of the lens portion in order to align the liquid crystalline polymers.

6. The polarization-dependent lens structure according to claim 1, wherein the long axes of the 1D lattice structures of the lens portion are aligned in a direction horizontal or vertical to an axis of the lens.

7. The polarization-dependent lens structure according to claim 1, wherein the optically-isotropic polymer layer is formed in a reverse lens shape on the first surface by performing imprinting by using a lens-shaped mold.

8. The polarization-dependent lens structure according to claim 3, wherein the polarization-dependent lens structure further includes an alignment layer on the first surface of the optically-isotropic polymer layer.

9. The polarization-dependent lens structure according to claim 1, wherein the nano-scale 1D lattice structure is configured with lattices having such a period that optical diffraction of light incident on the lens portion does not occur.

10. A method of manufacturing a polarization-dependent lens structure, comprising steps of:
(a) preparing a substrate;
(b) applying an optically-isotropic polymer material on the substrate and, after that, forming a optically-isotropic polymer layer having a reverse lens shape on an upper surface thereof;
(c) coating an upper surface of the optically-isotropic polymer layer with liquid crystalline monomers;
(d) arranging the liquid crystalline monomers by allowing a mold having nano-scale 1D lattice structures to be in contact with a surface of the coated liquid crystalline monomers;
(e) forming a liquid crystalline polymer layer by photo-curing the liquid crystalline monomers; and
(f) forming a lens portion on which a surface the nano-scale 1D lattice structures are formed by separating the mold.

11. The method according to claim 10, further comprising a step (g) of forming on a surface of the lens portion a protection layer which prevents alignment of the liquid crystalline polymer layer from being destructed.

12. The method according to claim 10, wherein the step (b) includes steps of:
applying the optically-isotropic polymer material on the substrate; and
forming a reverse lens shape on an upper surface of the applied optically-isotropic polymer material by performing nano-imprinting by using a nano-scale lens-shaped mold.

13. The method according to claim 10, wherein in the step (d), the mold having the nano-scale 1D lattice structures is in contacted with the surface of the liquid crystalline monomers so that long axes of the 1D lattice structures are aligned in a direction horizontal or vertical to an axis of a lens.

14. The method according to claim 10, further comprising a step of removing the substrate as a final step.

15. The method according to claim 10, wherein the step (b) is applying the optically-isotropic polymer material on the substrate, forming the optically-isotropic polymer layer having a reverse lens shape on the upper surface thereof, and forming an alignment layer on a surface of the optically-isotropic polymer layer.

* * * * *